US012118906B2

(12) United States Patent
Wei et al.

(10) Patent No.: US 12,118,906 B2
(45) Date of Patent: Oct. 15, 2024

(54) METHOD FOR SENSING DISPLAY PANEL, AND DISPLAY PANEL

(71) Applicants: Hefei BOE Joint Technology Co., Ltd., Anhui (CN); BOE Technology Group Co., Ltd., Beijing (CN)

(72) Inventors: Xiaolong Wei, Beijing (CN); Fei Yang, Beijing (CN); Song Meng, Beijing (CN); Jingbo Xu, Beijing (CN); Jianbo Xian, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/764,992

(22) PCT Filed: May 28, 2021

(86) PCT No.: PCT/CN2021/096718
§ 371 (c)(1),
(2) Date: Mar. 30, 2022

(87) PCT Pub. No.: WO2022/246790
PCT Pub. Date: Dec. 1, 2022

(65) Prior Publication Data
US 2024/0054925 A1 Feb. 15, 2024

(51) Int. Cl.
*G09G 3/00* (2006.01)
*G09G 3/3233* (2016.01)

(52) U.S. Cl.
CPC .......... *G09G 3/006* (2013.01); *G09G 3/3233* (2013.01); *G09G 2300/0842* (2013.01)

(58) Field of Classification Search
CPC ...... G09G 3/32; G09G 3/3258; G09G 3/3266; G09G 3/3275; G09G 3/3291; G09G 2300/0439; G09G 2300/0413; G09G 2300/0426; G09G 2300/0819; G09G 2300/0842; G09G 2300/0861; G09G 2310/0286; G09G 2310/08; G09G 2320/0209; G09G 2320/029; G09G 2320/045; G09G 3/3233; G09G 2310/061; G09G 2310/0267; G09G 2310/06–068; G09G 2230/00; G09G 3/006;
(Continued)

(56) References Cited

U.S. PATENT DOCUMENTS

2012/0306947 A1 12/2012 Kim et al.
2014/0176401 A1 6/2014 Kim et al.
(Continued)

FOREIGN PATENT DOCUMENTS

CN 102810293 A 12/2012
CN 103886830 A 6/2014
(Continued)

*Primary Examiner* — Amr A Awad
*Assistant Examiner* — Aaron Midkiff
(74) *Attorney, Agent, or Firm* — Ling Wu; Stephen Yang; Ling and Yang Intellectual Property

(57) ABSTRACT

A method for sensing a display panel includes: sensing an electrical characteristic parameter of a driving transistor of a pixel circuit of a sub-pixel in an X-th row in a blank stage between an N-th frame and an (N+1)-th frame, wherein X is a random number, and both N and X are positive integers.

17 Claims, 5 Drawing Sheets

(58) Field of Classification Search
CPC ........... G09G 2320/0295; H10K 59/12; G11C 19/28–0287
See application file for complete search history.

(56) References Cited

U.S. PATENT DOCUMENTS

| | | | | |
|---|---|---|---|---|
| 2015/0279272 | A1* | 10/2015 | Takahara | G09G 3/3233 345/76 |
| 2016/0012800 | A1 | 1/2016 | Han et al. | |
| 2018/0151124 | A1* | 5/2018 | An | G09G 3/3225 |
| 2019/0378459 | A1 | 12/2019 | Kim et al. | |
| 2020/0043421 | A1 | 2/2020 | Kang et al. | |
| 2020/0168162 | A1 | 5/2020 | Feng et al. | |
| 2021/0256912 | A1* | 8/2021 | Seo | G09G 3/3266 |

FOREIGN PATENT DOCUMENTS

| | | | |
|---|---|---|---|
| CN | 105243985 | A | 1/2016 |
| CN | 109935185 | A | 6/2019 |
| CN | 110599958 | A | 12/2019 |
| CN | 110808011 | A | 2/2020 |
| KR | 10-2018-0075910 | A | 7/2018 |

* cited by examiner

METHOD FOR SENSING DISPLAY PANEL, AND DISPLAY PANEL

CROSS-REFERENCE TO RELATED APPLICATION

The present application is a U.S. National Phase Entry of International Application No. PCT/CN2021/096718 having an international filing date of May 28, 2021, the content of which is hereby incorporated by reference.

TECHNICAL FIELD

The present text relates to, but is not limited to, the field of display technology, in particular to a method for sensing a display panel, and a display panel.

BACKGROUND

An Organic Light Emitting Diode (OLED for short) and a Quantum-dot Light Emitting Diode (QLED for short) are active light emitting display devices and have advantages of self-illumination, wide viewing angle, high contrast, low power consumption, extremely high reaction speed, lightness and thinness, bendability, low cost, etc. With the constant development of a display technology, a flexible display that uses an OLED or a QLED as a light emitting device and performs signal control by a Thin Film Transistor (TFT for short) has become a mainstream product in the field of display at present.

SUMMARY

The following is a summary of subject matters described herein in detail. This summary is not intended to limit the scope of protection of the claims.

Embodiments of the present disclosure provide a method for sensing a display panel, and a display panel.

In one aspect, the embodiments of the present disclosure provide a method for sensing a display panel, including: sensing an electrical characteristic parameter of a driving transistor of a pixel circuit of a sub-pixel in an X-th row in a blank stage between an N-th frame and an (N+1)-th frame. Herein, both N and X are positive integers, and X is a random number.

In some exemplary implementations, X is a non-repeating random number determined by traversing a first range, wherein the first range includes positive integers not greater than R, and R is the total number of rows of the sub-pixels of the display panel.

In some exemplary implementations, in a first sensing cycle, a value range of N is the first range.

In some exemplary implementations, a relationship between N and X within at least one sensing cycle is determined by a Randperm function.

In some exemplary implementations, a random array is obtained by the Randperm function, and X is an N-th element value in the random array.

In some exemplary implementations, the sensing an electrical characteristic parameter of a driving transistor of a pixel circuit of a sub-pixel in an X-th row in a blank stage between an N-th frame and an (N+1)-th frame includes: generating a sensing clock signal by using a random control signal; and generating, by using, by a sensing driving circuit, the sensing clock signal, a sensing starting signal, and an enable control signal, a sensing control signal provided for the pixel circuit of the sub-pixel in the X-th row in the blank stage between the N-th frame and the (N+1)-th frame.

In some exemplary implementations, the sensing clock signal, the sensing starting signal, and the enable control signal are pulse signals. A pulse width of a sensing pulse of the sensing starting signal is greater than a pulse width of a clock pulse of the sensing clock signal and is not greater than twice the pulse width of the clock pulse, and a pulse width of the enable control signal is greater than the pulse width of the sensing pulse.

In some exemplary implementations, the sensing starting signal includes a sensing pulse, and R clock pulses are at least included between adjacent sensing pulses, wherein R is the total number of rows of the sub-pixels of the display panel.

In some exemplary implementations, the sensing pulse provided by the sensing starting signal in the N-th frame is shifted and outputted to the pixel circuit of the sub-pixel in the X-th row by the sensing driving circuit in the blank stage between the N-th frame and the (N+1)-th frame.

In some exemplary implementations, the sensing clock signal provided for the sensing driving circuit in the N-th frame includes a first clock pulse group, wherein the first clock pulse group includes X clock pulses, and a starting moment of a first clock pulse in the X clock pulses is not earlier than a starting moment of a sensing pulse in the sensing starting signal provided for the sensing driving circuit in the N-th frame.

In some exemplary implementations, the sensing method further includes: after completing sensing the electrical characteristic parameter of the driving transistor of the pixel circuit of the sub-pixel in the X-th row, resetting the sensing driving circuit by using a second clock pulse group of the sensing clock signal; the second clock pulse group includes X1 clock pulses, and X1 is greater than R−X; and R is the total number of rows of the sub-pixels of the display panel.

In some exemplary implementations, the sensing method further includes: generating, by using, by the sensing driving circuit, the sensing pulse provided by the sensing starting signal in an (N+1)-th frame, the first clock pulse group provided by the sensing clock signal in the (N+1)-th frame, and the enable control signal, a sensing control signal provided for a pixel circuit of a sub-pixel in a Y-th row in a blank stage between the (N+1)-th frame and an (N+2)-th frame; the first clock pulse group provided by the sensing clock signal in the (N+1)-th frame includes Y clock pulses; herein, Y is a random positive integer, and Y is different from X.

In some exemplary implementations, Y clock pulses and X1 clock pulses are not continuous.

In some exemplary implementations, the sensing method further includes: after completing sensing the electrical characteristic parameter of the driving transistor of the pixel circuit of the sub-pixel in the Y-th row, resetting the sensing driving circuit by using a second clock pulse group of the sensing clock signal, wherein the second clock pulse group includes Y1 clock pulses, Y1 is greater than R−Y, and R is the number of rows of the sub-pixels of the display panel.

In some exemplary implementations, the sensing the electrical characteristic parameter of the driving transistor of the pixel circuit of the sub-pixel in the X-th row in the blank stage between the N-th frame and the (N+1)-th frame includes: sensing the electrical characteristic parameter of the driving transistor of the pixel circuit of sub-pixels of b colors in the X-th row of sub-pixels in the blank stage between the N-th frame and the (N+1)-th frame, wherein b is a positive integer, and b is less than or equal to the number of the sub-pixels included in one pixel unit.

In another aspect, an embodiment of the present disclosure provides a display panel, including: a pixel array and a gate driver. The pixel array includes multiple sub-pixels, and at least one sub-pixel includes a light emitting element and a pixel circuit that drives the light emitting element to emit light. The gate driver is configured to provide a sensing control signal for the pixel circuit of the sub-pixel in the X-th row by a sensing control line within the blank stage between the N-th frame and the (N+1)-th frame, so as to sense the electrical characteristic parameter of the driving transistor of the pixel circuit of the sub-pixel in the X-th row. Herein, both N and X are positive integers, and X is a random number.

In some exemplary implementations, the display panel further includes: a timing controller. The timing controller is configured to generate a sensing clock signal by using a random control signal, and provide the sensing clock signal for the gate driver. The gate driver is configured to generate a sensing control signal provided for the pixel circuit of the sub-pixel in the X-th row in the blank stage between the N-th frame and the (N+1)-th frame by using the sensing clock signal, a sensing starting signal, and an enable control signal.

In some exemplary implementations, the timing controller includes: a random signal generation circuit, configured to generate the random control signal.

In some exemplary implementations, the gate driver includes: a sensing driving circuit. The sensing driving circuit includes: multiple cascaded shift register units and multiple logical AND gates. An output end of an i-th-stage shift register unit is connected to an input end of an (i+1)-th-stage shift register unit, and an input end of the first-stage shift register unit is connected to a sensing starting signal line that provides a sensing starting signal. Clock ends of the multiple shift register units are connected to a sensing clock signal line that provides a sensing clock signal. An input end of an i-th logical AND gate is connected to an output end of the i-th-stage shift register unit and an enable control line that provides an enable control signal, and an output end of the i-th logical AND gate is connected to a sensing control line connected to the pixel circuit of the i-th row of sub-pixels. Herein, i is a positive integer.

In some exemplary implementations, the pixel circuit includes: an input transistor, a driving transistor, a sensing transistor, and a first storage capacitor. A control electrode of the input transistor is connected to a scanning signal line, a first electrode is connected to a data signal line, and a second electrode is connected to a control electrode of the driving transistor. A first electrode of the driving transistor is connected to a first power supply line, and a second electrode is connected to a light emitting element. A first electrode of the first storage capacitor is connected to the control electrode of the driving transistor, and a second electrode is connected to the second electrode of the driving transistor. A control electrode of the sensing transistor is connected to a sensing control line, a first electrode is connected to the second electrode of the driving transistor, and a second electrode is connected to a sensing signal line.

After the accompanying drawings and detailed descriptions are read and understood, other aspects may be understood.

BRIEF DESCRIPTION OF DRAWINGS

Accompanying drawings are used to provide further understanding of technical solutions of the present disclosure, constitute a part of the specification, and are used to explain the technical solutions of the present disclosure together with the embodiments of the present disclosure, but do not constitute a limitation on the technical solutions of the present disclosure. Shapes and sizes of one or more components in the accompanying drawings do not reflect actual scales and are only intended to illustrate the contents of the present disclosure.

DETAILED DESCRIPTION

Figure 1:
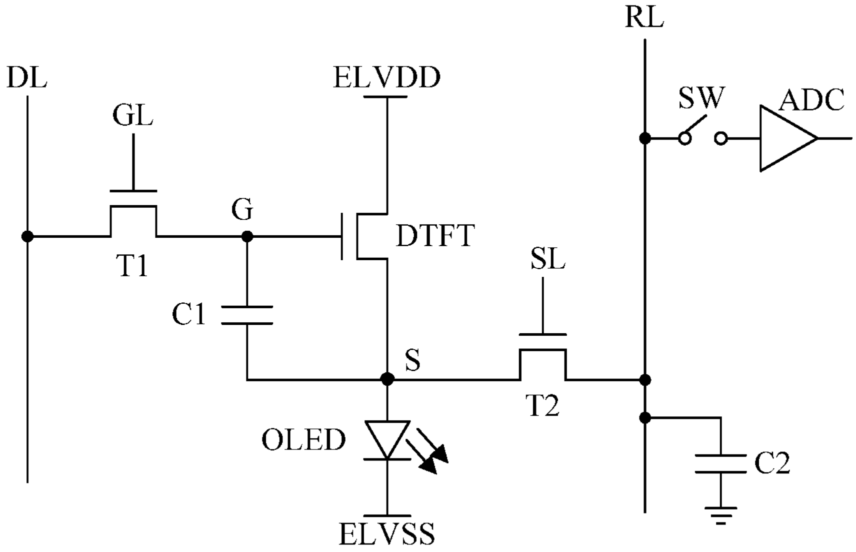
FIG. 1 is a schematic diagram of a pixel circuit.

The embodiments of the present disclosure will be described in detail with reference to the accompanying drawings. Implementations may be implemented in multiple different forms. Those of ordinary skill in the art may readily understand one fact that the implementations and contents may be changed into one or more forms without departing from the spirit and scope of the present disclosure. Therefore, the present disclosure should not be construed as only being limited to the contents described in the following embodiments. The embodiments in the present disclosure and the features in the embodiments may be combined randomly with each other if there is no conflict.

In the accompanying drawings, a size of one or more constituent elements, and a thickness or an area of a layer is sometimes exaggerated for clarity. Therefore, one implementation of the present disclosure is not necessarily limited to the dimension, and shapes and sizes of one or multiple components in the accompanying drawings do not reflect actual scales. In addition, the accompanying drawings schematically show an ideal example, and one implementation of the present disclosure is not limited to the shape, the value, or the like shown in the accompanying drawings.

Ordinal numerals such as “first”, “second” and “third” in the present disclosure are set to avoid confusion between constituent elements, but are not intended to limit in terms of quantity. “Multiple” in the present disclosure means a quantity of two or more.

In the present disclosure, for convenience, wordings indicating orientations or positional relationships, such as “middle”, “upper”, “lower”, “front”, “back”, “vertical”, “horizontal”, “top”, “bottom”, “inside”, “outside”, and the like are used to describe the positional relationships of the constituent elements with reference to the accompanying drawings, and are merely for facilitating describing the present specification and simplifying the description, rather than indicating or implying that the referred apparatus or element must have a particular orientation, and be constructed and operated in the particular orientation. Thus, they cannot be construed as limitations on the present disclosure. The positional relationships between the constituent elements appropriately change according to directions according to which the constituent elements are described. Therefore, it is not limited to the wordings described in the specification, and may be replaced appropriately according to situations.

In the present disclosure, unless otherwise specified and defined explicitly, terms "mount", "mutually connect", and "connect" should be understood in a broad sense. For example, the terms may refer to a fixed connection, or a detachable connection, or an integration connection. The terms may refer to a mechanical connection or an electrical connection. The terms may refer to a direct mutual connection, may refer to an indirect connection through a middleware, or may refer to internal communication between two components. For those of ordinary skill in the art, meanings of the abovementioned terms in the present disclosure may be understood according to situations. Herein, "electrical connection" includes a situation where constituent elements are connected together by an element with certain electrical effect. There is no specific restriction on "the element with certain electrical effect" as long as they may transmit electrical signals between the connected constituent elements. Examples of "the elements with certain electrical effect" not only include electrodes and wirings, but also include switch elements such as transistors, resistors, inductors, capacitors, or other elements with one or more functions, etc.

In the present disclosure, a transistor refers to an element at least including three terminals, i.e., a gate electrode (gate), a drain electrode, and a source electrode. A transistor has a channel region between a drain electrode (or referred to as a drain electrode terminal, a drain region, or a drain electrode) and a source electrode (or referred to as a source electrode terminal, a source region, or a source electrode), and a current can flow through the drain electrode, the channel region, and the source electrode. In the present disclosure, the channel region refers to a region through which the current mainly flows.

In the present disclosure, in order to distinguish two electrodes, other than a gate electrode, of a transistor, one of the electrodes is referred to as a first electrode, and the other electrode is referred to as a second electrode. The first electrode may be a source electrode or a drain electrode, and the second electrode may be a drain electrode or a source electrode. In addition, the gate electrode of the transistor is referred to as a control electrode. Functions of the "source electrode" and the "drain electrode" sometimes interchange with each other in a situation that transistors with opposite polarities are used or a current direction changes during circuit operation, or the like. Therefore, in the present disclosure, the "source electrode" and the "drain electrode" are interchangeable.

In the present disclosure, "parallel" refers to a state in which an angle formed by two straight lines is above −10° and below 10°. Therefore, it may include the state in which the angle is above −5° and below 5°. In addition, "perpendicular" refers to a state in which an angle formed by two straight lines is above 80° and below 100°. Therefore, it may include the state in which the angle is above 85° and below 95°.

In the present disclosure, "film" and "layer" are interchangeable. For example, "conductive layer" may be replaced with "conductive film" sometimes. Similarly, "insulating film" may be replaced with "insulating layer" sometimes.

"About", or "more or less" in the present disclosure refers to a situation that a boundary is defined not strictly and numerical values within process and measurement error ranges are allowed.

Taking an OLED display panel as an example, during the operation of the OLED display panel, a light emitting element in the display panel is driven to emit light by a pixel circuit of sub-pixels in the display panel, so as to realize a display function. Generally speaking, the pixel circuit includes a driving transistor, the driving transistor generating a driving current, and the driving current driving the light emitting element to emit light. However, since the display panel is limited by a preparation process during manufacture, it is caused that there is a difference in electrical characteristic parameter of the driving transistor included in the pixel circuit in the display panel, and the difference easily affects brightness uniformity of the display panel.

In some examples, a corrected compensation data signal may be generated by using an external compensation technology and by sensing the electrical characteristic parameters (for example, including a threshold voltage and electron mobility) of the driving transistor in each pixel circuit, and the compensation data signal is then inputted into the driving transistor, realizing performing compensating for the electrical characteristic parameters of the driving transistor, so as to improve the case of inconsistent display brightness of the display panel caused by different electrical characteristic parameters of the driving transistor in the pixel circuit.

FIG. 1 is a schematic diagram of a pixel circuit. As shown in FIG. 1, the pixel circuit may include: an input transistor T1, a driving transistor DTFT, a sensing transistor T2, and a first storage capacitor C1. A control electrode of the input transistor T1 is connected to a scanning signal line GL, a first electrode of the input transistor T1 is connected to a data signal line DL, and a second electrode of the input transistor T1 is connected to a control electrode of the driving transistor DTFT. A first electrode of the driving transistor DTFT is connected to a first power supply line ELVDD, and a second electrode of the driving transistor DTFT is connected to a first electrode of a light emitting element OLED. A second electrode of the light emitting element OLED is connected to a second power supply line ELVSS. A first electrode of the first storage capacitor C1 is connected to the control electrode of the driving transistor DTFT, and a second electrode of the first storage capacitor C1 is connected to the second electrode of the driving transistor DTFT. A control electrode of the sensing transistor T2 is connected to a sensing control line SL, a first electrode of the sensing transistor T2 is connected to the second electrode of the driving transistor DTFT, and a second electrode of the sensing transistor T2 is connected to a sensing signal line RL. As shown in FIG. 1, the display panel is disposed with a second storage capacitor C2, a digital sampler ADC, and a sampling switch SW which are connected to the pixel circuit. Herein, a first electrode of the second storage capacitor C2 is connected to the sensing signal line RL, and a second electrode of the second storage capacitor C2 is connected to a ground signal line. The sampling switch SW is configured to control a electrical connection between the digital sampler ADC and the sensing signal line RL.

In some examples, when a driving voltage loaded on the control electrode of the driving transistor DTFT is Vg, a source voltage of the driving transistor DTFT is sensed as a sensing voltage Vs, and the electron mobility K of the driving transistor DTFT may be calculated according to the driving voltage Vg and the sensing voltage Vs.

In some examples, based on the pixel circuit shown in FIG. 1, a process of compensating the electrical characteristic parameters of the driving transistor DTFT in the pixel circuit of the display panel may include following processes. A scanning signal is inputted by the scanning signal line GL to control the input transistor T1 to be conducted, a test data signal is written into the data signal line DL, the test data signal is transmitted to the control electrode of the driving transistor DTFT through the input transistor T1, so as to change a voltage of the control electrode G of the driving transistor DTFT into Vg, and the second electrode (for example, the source electrode S) of the driving transistor DTFT has an initialized voltage $V_0$. The sensing transistor T2 is controlled to be conducted by a sensing control signal inputted by the sensing control line SL, when a voltage difference Vgs between the control electrode and the source electrode of the driving transistor DTFT is greater than a threshold voltage of the driving transistor DTFT, the driving transistor DTFT is conducted to generate a driving current $I_{oled}$, the driving current $I_{oled}$ charges the second capacitor C2 through the sensing transistor T2; and with the increase of a charging duration, a potential of the source electrode of the driving transistor DTFT continuously increases until the driving transistor DTFT is in an off state, the potential of the source electrode of the driving transistor DTFT not increasing any longer, so as to stop charging the second storage capacitor C2. At this moment, the source voltage Vs (i.e., the sensing voltage) of the driving transistor DTFT is sensed through the sensing signal line RL, so that the threshold voltage Vth=Vg−Vs of the driving transistor DTFT may be obtained.

The threshold voltage Vth, the electron mobility K, and the driving current $I_{oled}$ of the driving transistor DTFT satisfy a following formula:

$$I_{oled}=\frac{1}{2}K\times C_{ox}\times W/L\times(V_{gs}-V_{th})^2.$$

Herein, $C_{ox}$ is a capacitance of a gate oxide layer, W/L is a width to length ratio of a channel region of the driving transistor DTFT, and Vgs is a gate-to-source voltage of the driving transistor DTFT.

It can be seen from the above formula that the electron mobility K and the threshold voltage Vth of the driving transistor DTFT have a certain influence on the driving current Idled.

Based on the above-mentioned formula, after threshold voltage compensation is performed on the driving transistor DTFT, the second storage capacitor C2 is charged at a fixed time by using the voltage after the threshold voltage compensation, and the obtained value of the voltage (i.e., a source potential of the driving transistor DTFT) stored in the second storage capacitor C2 is in direct proportion to the electron mobility K, so that the electron mobility K may be revealed by using the source potential.

After the threshold voltage Vth and the electron mobility K of the driving transistor DTFT are obtained, a compensated compensation data signal may be obtained, and compensating the electrical characteristic parameters of the driving transistor DTFT may be realized by writing the compensation data signal into the control electrode of the driving transistor DTFT.

Figure 2:
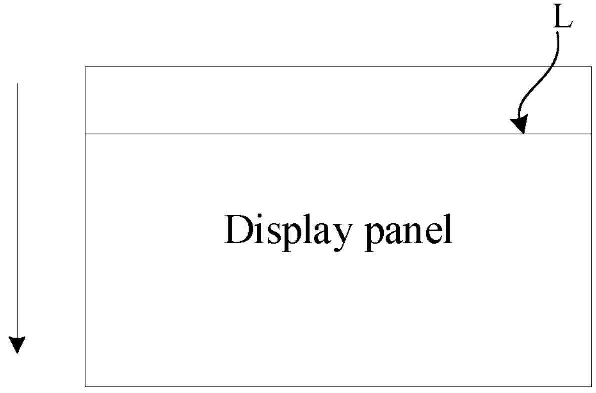
FIG. 2 is a schematic diagram of generating, by a display panel, a horizontal dark line.

In some examples, since the electron mobility of the driving transistor DTFT is easily affected by the factors, such as temperature, etc., during displaying, a better display effect is achieved in a real-time sensing mode. Herein, the real-time sensing mode may include: in a blank stage between active stages of every two frames, a sensing control signal is provided for one or more sensing control lines, the sensing of the electron mobility K of the driving transistor DTFT of one or more rows of sub-pixels is completed, and display is completed by using the compensation data signal obtained by the sensed data during an active stage. Herein, the blank stage is a time interval beyond a display screen of the display panel. Since the light emitting element in a sensed row is not lighted to emit light any longer during real-time sensing in the blank stage, the lighting and light emitting time of the sensed row is less than that of a non-sensed row (the brightness difference cannot be completely eliminated even if the display brightness of the sensed row is compensated), which is a horizontal dark line in a display phenomenon. FIG. 2 is a schematic diagram of a display panel generating a horizontal dark line. As shown in FIG. 2, one cycle of sensing is completed according to a sequence from top to bottom of the display panel during real-time sensing of the electrical characteristic parameters of the driving transistor of the display panel, and a horizontal dark line L which is displayed cyclically from top to bottom will appear on the display panel.

At least one embodiment of the present disclosure provides a method for sensing a display panel, including: sensing electrical characteristic parameters of a driving transistor of a pixel circuit of a sub-pixel in an X-th row in a blank stage between an N-th frame and an (N+1)-th frame. Herein, both N and X are positive integers, and X is a random number.

According to the method for sensing the display panel provided by this exemplary embodiment, the electrical characteristic parameters of the driving transistor of sub-pixels in one row of the display panel are sensed randomly in the blank stage between adjacent two frames. The position where the horizontal dark line is generated by real-time sensing cannot be predicted artificially in a random sensing mode of this example, so that human eyes cannot sense the horizontal dark line, thereby improving user experience.

In some exemplary implementations, X is a non-repeating random number determined by traversing a first range, wherein the first range includes positive integers not greater than R, and R is the total number of rows of the sub-pixels of the display panel. In this example, the pixel circuit of the sub-pixels is sensed according to a randomly determined row sensing sequence within one sensing cycle. In this example, one sensing cycle may include a sensing process for R rows of sub-pixels.

In some exemplary implementations, the electrical characteristic parameters of a driving transistor of a pixel circuit of sub-pixels of b colors in the X-th row of sub-pixels are sensed in a blank stage between an N-th frame and an (N+1)-th frame. Herein, b is a positive integer, and b is less than or equal to the number of the sub-pixels included in one pixel unit. In some examples, one pixel unit may include a sub-pixels (for example, including three colors of sub-pixels, i.e., red sub-pixels, green sub-pixels, and blue sub-pixels, or including four colors of sub-pixels, i.e., red sub-pixels, green sub-pixels, blue sub-pixels, and white sub-pixels), and a is a positive integer. The pixel circuit of one color of sub-pixels may be sensed in one sensing cycle. For example, taking one pixel unit including three colors of sub-pixels, i.e., the red sub-pixels, the green sub-pixels, and the blue sub-pixels, as an example, the pixel circuit of the red sub-pixels in each row may be sensed according to a randomly determined row sensing sequence in a first sensing cycle, the pixel circuit of the green sub-pixels in each row may be sensed according to a randomly determined row sensing sequence in a second sensing cycle, and the pixel circuit of the blue sub-pixels in each row may be sensed according to a randomly determined row sensing sequence in a third sensing cycle. The subsequent sensing cycles may be sequentially cycled in a mode of the first sensing cycle, the second sensing cycle, and the third sensing cycle. However, the present embodiment is not limited thereto. In some examples, the pixel circuits of multiple colors of sub-pixels may be sensed in one sensing cycle; for example, the pixel circuits of three colors of sub-pixels, i.e., the red sub-pixels, the green sub-pixels, and the blue sub-pixels, may be sequentially sensed according to a row sensing sequence within one sensing cycle. For example, within one sensing cycle, for an X-th row, the pixel circuit of the red sub-pixels in the X-th row is sensed, for an (X+1)-th row, the pixel circuit of the green sub-pixels in the (X+1)-th row is sensed, and for an (X+2)-th row, the pixel circuit of the blue sub-pixels in the (X+2)-th row is sensed. In some other examples, within one sensing cycle, the electrical characteristic parameters of the driving transistors of the pixel circuits of sub-pixels of at least two colors in a random row may be sensed in a blank stage of two adjacent frames. For example, the electrical characteristic parameters of the transistors of the pixel circuits of the red sub-pixels and the green sub-pixels in the X-th row of sub-pixels may be sensed in a blank stage between the N-th frame and the (N+1)-th frame.

In some exemplary implementations, the row sensing sequence in each sensing cycle may be same, i.e., after the random row sensing sequence is determined in the first sensing cycle, sensing may be performed according to the determined row sensing sequence in subsequent sensing cycles. Or, the row sensing sequences in different sensing cycles may be partially same or completely different; for example, the row sensing sequences of odd sensing cycles are same, and the row sensing sequences of even sensing cycles are same; and for another example, the row sensing sequences in multiple sensing cycles may be different from each other and are all determined randomly. However, the present embodiment is not limited thereto.

In some exemplary implementations, in a first sensing cycle, the value range of N is the first range. For example, R=2160, the electrical characteristic parameters of the driving transistor of the pixel circuit of the randomly determined row of sub-pixels are sensed in the blank stage after each frame of the first frame to the $2160^{th}$ frame. In this example, in the first sensing cycle, the value range of N is the same as the value range of X. However, the present embodiment is not limited thereto. In some examples, in the first sensing cycle, the value range of N may be different from the value range of X. For example, X may be determined by traversing the first range, and the value range of N may be greater than the first range. Taking R=2160 as an example, X may be a non-repeating random number determined by traversing 1 to 2160, and N may be 2160 non-repeating numbers selected from 1 to 2200. In this example, in continuous multiple frames, the electrical characteristic parameters of the driving transistor of the pixel circuit of one row of sub-pixels may be sensed, or not sensed, in a blank stage between two adjacent frames. In some examples, one sensing cycle at least needs R frames to complete.

In some exemplary implementations, a relationship between N and X within at least one sensing cycle may be determined by a Randperm function. In some examples, a one-dimensional array may be generated by the Randperm function, X may be an element value in the one-dimensional array, and N may be an address indicating the element value in the one-dimensional array. For example, X may be an N-th element value in a random array. Or, N may be an element value in the one-dimensional array, and X may be an address indicating the element value of the one-dimensional array. For example, N may be an X-th element value in a random array. In this example, the random array may be obtained by using the Randperm function, so as to determine a random relationship between a display frame and a sensing row.

In some examples, the relationship between N and X within each sensing cycle may be determined by the Randperm function. In each sensing cycle, the value range of X may be a first range, and the value range of N may change with the sensing cycle. For example, R is 2160, in a first sensing cycle, the value range of N may be a first range (i.e., 1 to 2160), in a second sensing cycle, the value range of N may be 2161 to 4320, and the like. However, the present embodiment is not limited thereto. In some examples, after the relationship between N and X within the first sensing cycle is determined by the Randperm function, the random relationship between N and X may be determined by updating the value range of N and according to a determined row sensing sequence within subsequent sensing cycles. For example, in the first sensing cycle, the pixel circuit of the sub-pixel in the X-th row is sensed in the blank stage between a k-th row and a (k+1)-th row, then in a c-th sensing cycle, the pixel circuit of the sub-pixel in the X-th row may be sensed in the blank stage between a (k+R*(c−1))-th row and a (k+R*(c−1)+1)-th row, wherein both k and c are positive integers.

In some exemplary implementations, the electrical characteristic parameters of the driving transistor of the pixel circuit of sub-pixels of one color in the X-th row of sub-pixels are sensed in the blank stage between an N-th frame and an (N+1)-th frame, and the electrical characteristic parameters of the driving transistor of the pixel circuit of sub-pixels of another color in the X-th row of sub-pixels are sensed in the blank stage between the (N+1)-th frame and an (N+2)-th frame. Taking one pixel unit including three colors of sub-pixels, such as red sub-pixels, green sub-pixels, and blue sub-pixels, as an example, the electrical characteristic parameters of the driving transistor of the pixel circuit of the red sub-pixels in the X-th row of sub-pixels are sensed in the blank stage between the N-th frame and the (N+1)-th frame; the electrical characteristic parameters of the driving transistor of the pixel circuit of the green sub-pixels in the X-th row of sub-pixels are sensed in the blank stage between the (N+1)-th frame and the (N+2)-th frame; and the electrical characteristic parameters of the driving transistor of the pixel circuit of the blue sub-pixels in the X-th row of sub-pixels are sensed in the blank stage between the (N+2)-th frame and an (N+3)-th frame. In this example, the pixel circuit of one color of sub-pixels in one row of sub-pixels is sensed in one blank stage, in addition, one sensing cycle (i.e., completing the sensing of R rows) of this example at least needs R*a frames to complete, wherein, a is the number of sub-pixels included in the pixel unit, for example, a=3. However, the present embodiment is not limited thereto.

In some exemplary implementations, the sensing the electrical characteristic parameters of a driving transistor of a pixel circuit of a sub-pixel in an X-th row in a blank stage between an N-th frame and an (N+1)-th frame includes: generating a sensing clock signal by using a random control signal; and generating, by using, by a sensing driving circuit, the sensing clock signal, a sensing starting signal, and an enable control signal, a sensing control signal provided for the driving circuit of the sub-pixel in the X-th row in the blank stage between the N-th frame and the (N+1)-th frame.

In some exemplary implementations, the sensing clock signal, the sensing starting signal, and the enable control signal are pulse signals. The pulse width of the sensing pulse of the sensing starting signal is greater than the pulse width of the clock pulse of the sensing clock signal and is not greater than twice the pulse width of the clock pulse, and the pulse width of the enable control signal is greater than the pulse width of the sensing pulse. In this example, the pulse width is a width of a pulse, i.e., a duration of a high level.

In some exemplary implementations, the sensing starting signal includes a sensing pulse, and R clock pulses are at least included between adjacent sensing pulses, wherein R is the total number of rows of the sub-pixels of the display panel. This example may ensure that there is enough time to reset the sensing driving circuit after a random row is sensed in a blank stage.

In some exemplary implementations, the sensing pulse provided by the sensing starting signal in the N-th frame is shifted and outputted to the pixel circuit of the sub-pixel in the X-th row by the sensing driving circuit in the blank stage between the N-th frame and the (N+1)-th frame.

In some exemplary implementations, the sensing clock signal provided for the sensing driving circuit in the N-th frame includes a first clock pulse group, the first clock pulse group includes X clock pulses, and a starting moment of a first clock pulse in the X clock pulses is not earlier than a starting moment of the sensing pulse in the sensing starting signal provided for the sensing driving circuit in the N-th frame. For example, a starting moment of the first clock pulse in the first clock pulse group provided for the sensing driving circuit in the N-th frame is approximately the same as a starting moment of the sensing pulse. In this example, the sensing pulse is shifted by using X clock pulses, so as to control the X-th row of sub-pixels to realize sensing.

In some exemplary implementations, the sensing method of the present embodiment further includes: after sensing the electrical characteristic parameters of the driving transistor of the pixel circuit of a sub-pixel in an X-th row is completed, the sensing driving circuit is reset by using a second clock pulse group of the sensing clock signal. The second clock pulse group includes X1 clock pulses, wherein X1 is greater than R−X; and R is the total number of rows of sub-pixels of the display panel. In this example, the sensing pulse is shifted by using the second clock pulse group, so as to realize resetting the sensing driving circuit.

In some exemplary implementations, the sensing method of the present embodiment further includes: a sensing control signal provided for the pixel circuit of a sub-pixel in a Y-th row is generated within a blank stage between the (N+1)-th frame and a (N+2)-th frame, by using, by the sensing driving circuit, the sensing pulse provided by the sensing starting signal in an (N+1)-th frame, the first clock pulse group provided by the sensing clock signal in the (N+1)-th frame, and the enable control signal; and the first clock pulse group provided by the sensing clock signal in the (N+1)-th frame includes Y clock pulses. Herein, Y is a random positive integer, and Y is different from X.

In some exemplary implementations, Y clock pulses and X1 clock pulses are not continuous.

In some exemplary implementations, the sensing method of the present embodiment further includes: after sensing the electrical characteristic parameters of the driving transistor of the pixel circuit of a sub-pixel in a Y-th row is completed, the sensing driving circuit is resetted by using the second clock pulse group of the sensing clock signal, wherein the second clock pulse group includes Y1 clock pulses, Y1 is greater than R−Y, and R is the number of rows of sub-pixels of the display panel.

The solution of the present embodiment is illustrated below by some examples.

Figure 3:
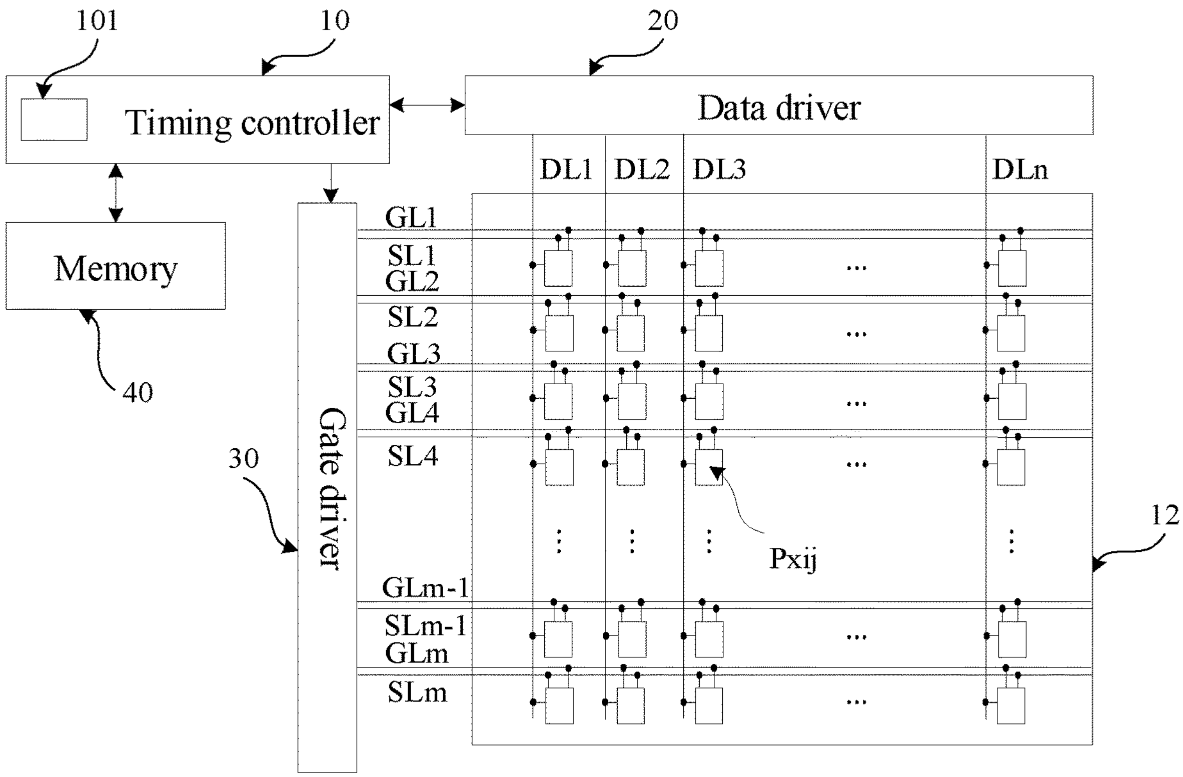
FIG. 3 is a schematic structural diagram of a display panel according to at least one embodiment of the present disclosure.

FIG. 3 is a schematic diagram of the display panel according to at least one embodiment of the present disclosure. As shown in FIG. 3, the display panel of the present exemplary embodiment includes: a pixel array 12 and a panel driver. The panel driver is configured to drive the pixel array 12. The panel driver may include: a timing controller 10, a data driver 20, a gate driver 30, and a memory 40 configured to store compensation data.

In some exemplary implementations, the pixel array 12 may include: multiple scanning signal lines (for example, GL1 to GLm), multiple data signal lines (for example, DL1 to DLn), multiple sensing control lines (for example, SL1 to SLm), and multiple sensing signal lines (not shown in the drawings), and multiple sub-pixels Pxij. Herein, both m and n are positive integers.

In some exemplary implementations, the multiple scanning signal lines GL1 to GLm and the multiple sensing control signals SL1 to SLm are formed in a first direction (for example, the horizontal direction) of the display panel, and the multiple data signal lines DL1 to DLn and the multiple sensing signal lines may be formed in a second direction (for example, the vertical direction) of the display panel. Herein, the first direction intersects the second direction, for example, the first direction is perpendicular to the second direction. The multiple data signal lines and the multiple sensing signal lines are configured to intersect the multiple scanning signal lines and the multiple sensing control lines.

In some exemplary implementations, the timing controller 10 may provide a gray value and a control signal suitable for the specification of the data driver to the data driver 20. The data driver 20 may generate a data voltage to be supplied to the data signal lines DL1 to DLn by using the gray value and the control signal received from the timing controller 10. For example, the data driver 20 may sample the gray value by using a clock signal, and apply a data voltage corresponding to the gray value to the data signal lines DL1 to DLn by taking a sub-pixel row as a unit.

In some exemplary implementations, the timing controller 10 may provide a clock signal, a scanning starting signal, a sensing starting signal, or the like suitable for the specification of the gate driver for the gate driver 30. The gate driver 30 may generate a scanning signal to be provided to the scanning signal lines GL1 to GLm and a sensing control signal provided to the sensing control lines SL1 to SLm by receiving the clock signal, the scanning starting signal, the sensing starting signal, or the like from the timing controller 10. For example, the gate driver 30 may include: a scanning driving circuit and a sensing driving circuit. The scanning drive circuit may sequentially provide a scanning signal with an on-level pulse for the scanning signal lines GL1 to GLm. The sensing drive circuit may sequentially provide a sensing control signal with an on-level pulse for the sensing control lines SL1 to SLm. For example, the scanning driving circuit may be constructed in a form of a shift register and may generate a scanning signal by sequentially transmitting the scanning starting signal provided in a form of the on-level pulse to a next-stage circuit under the control of the scanning clock signal. The sensing driving circuit may be constructed in a form of a shift register and may generate a sensing control signal by sequentially transmitting the sensing control signal provided in a form of the on-level pulse to a next-stage circuit under the control of the sensing clock signal.

In some exemplary implementations, the data driver 20 may acquire sensing data through the sensing signal lines, and transmit the sensing data to the timing controller 10. The timing controller 10 may determine compensation data of the electrical characteristic parameters of the driving transistor according to the sensing data, and store the compensation data in the memory 40. In some examples, the memory 40 may store the compensation data of the electrical characteristic parameters of the driving transistor included in the display panel, or may store optical compensation data of the light emitting element of the display panel. However, the present embodiment is not limited thereto.

In some exemplary implementations, the scanning driving circuit and the sensing driving circuit included in the gate driver 30 may be located on opposite sides of the pixel array 12 (for example, a left side and a right side of the pixel array). However, the present embodiment is not limited thereto. For example, gate drivers are configured on both opposite sides of the pixel array, so as to realize bilateral driving of sub-pixels.

In some exemplary implementations, the gate driver 30 may be formed by using an integrated circuit, or may be directly formed on a substrate of the display panel during a process of preparing the pixel circuits of the sub-pixels. However, the present embodiment is not limited thereto.

In some exemplary implementations, each sub-pixel Pxij within the pixel array 12 may be connected to corresponding data signal line, scanning signal line, sensing control line, and sensing signal line, and i and j may be natural numbers. The sub-pixel Pxij may refer to a sub-pixel in which a transistor is connected to an i-th scanning signal line and is connected to a j-th data signal line.

Figure 4:
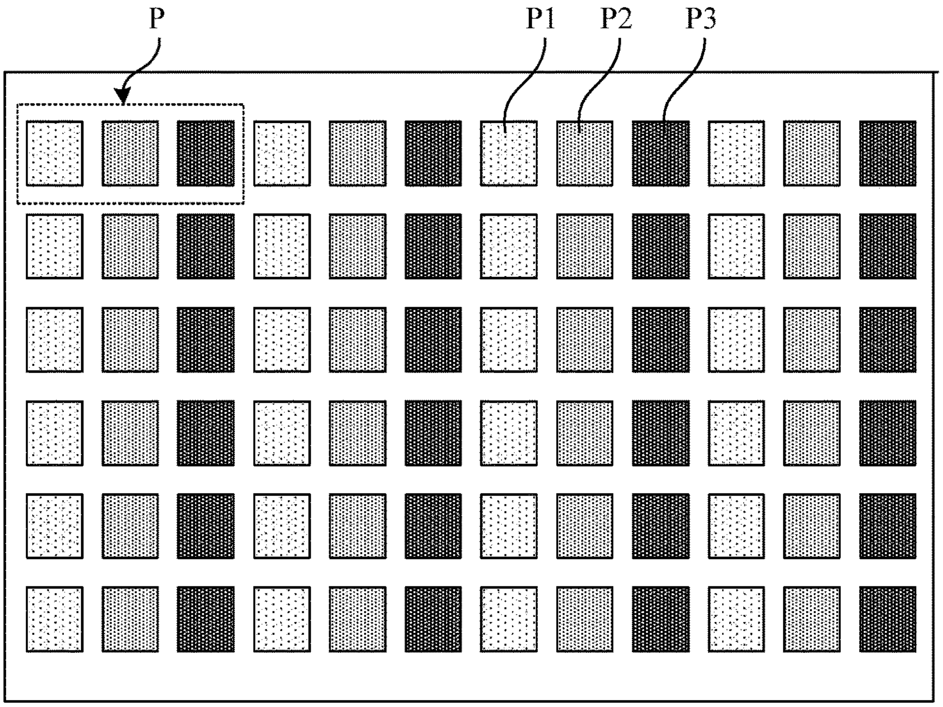
FIG. 4 is a schematic plane structural diagram of a display panel according to at least one embodiment of the present disclosure.

FIG. 4 is a schematic plane structural diagram of the display panel according to at least one embodiment of the present disclosure. As shown in FIG. 4, a display area of the display panel may include multiple pixel units P arranged in a matrix, wherein at least one of the multiple pixel units P includes a first sub-pixel P1 that emits first-color light, a second sub-pixel P2 that emits second-color light, and a third sub-pixel P3 that emits third-color light. Each of the first sub-pixel P1, the second sub-pixel P2, and the third sub-pixel P3 includes a pixel circuit and a light emitting element. The pixel circuits in the first sub-pixel P1, the second sub-pixel P2, and the third sub-pixel P3 may be respectively connected to the scanning signal lines and the data signal lines. The pixel circuit is configured to receive a data voltage transmitted by the data signal line under the control of the scanning signal line, and output a corresponding driving current to the light emitting element. The light emitting elements in the first sub-pixel P1, the second sub-pixel P2, and the third sub-pixel P3 are respectively connected to the pixel circuits of the sub-pixels where the light emitting elements are located, and the light emitting element is configured to emit light with corresponding brightness in response to the driving current output by the pixel circuit of the sub-pixel where the light emitting element is located.

In some exemplary implementations, the pixel unit P may include a Red (R) sub-pixel, a Green (G) sub-pixel, and a Blue (B) sub-pixel, or may include a red sub-pixel, a green sub-pixel, a blue sub-pixel, and a white sub-pixel, which is not limited by the present disclosure herein. In some exemplary implementations, the shape of the sub-pixel in the pixel unit may be a rectangle, a rhombus, a pentagon, or a hexagon. When the pixel unit includes three sub-pixels, the three sub-pixels may be arranged in parallel in a horizontal direction, in parallel in a vertical direction, or in a Delta shape. When the pixel unit includes four sub-pixels, the four sub-pixels may be arranged in parallel in the horizontal direction, in parallel in the vertical direction, or in a square, which is not limited by the present disclosure herein.

In some exemplary implementations, the sub-pixel includes a pixel circuit and a light emitting element. The pixel circuit may be a pixel circuit as shown in FIG. 1. In some exemplary implementations, a scanning transistor T1, a driving transistor DTFT, and a sensing transistor T2 may use low temperature poly-silicon thin film transistors, or may use oxide thin film transistors, or may use low temperature poly-silicon thin film transistors and oxide thin film transistors. An active layer of the low temperature poly-silicon thin film transistor uses Low Temperature Poly-Silicon (LTPS for short), and an active layer of the oxide thin film transistor uses an oxide. The low temperature poly-silicon thin film transistor has the advantages of high mobility, fast charging, and the like, and the oxide thin film transistor has the advantages of low leakage current and the like. In some exemplary implementations, the low temperature poly-silicon thin film transistors and the oxide thin film transistors may be integrated on one display substrate to form a Low Temperature Polycrystalline Oxide (LTPO for short) display substrate. The advantages of the low temperature poly-silicon thin film transistor and the oxide thin film transistor may be used, and high Pixel Per Inch (PPI for short) and low frequency driving may be realized, so that power consumption can be reduced, and display quality can be improved. However, the present embodiment is not limited thereto.

In some exemplary implementations, the light emitting element may be an Organic Light Emitting Diode (OLED for short), including a first electrode (anode), an organic light emitting layer, and a second electrode (cathode) that are stacked. However, the present embodiment is not limited thereto.

In some exemplary implementations, the timing controller 10 may generate a clock signal provided to the gate driver 30 according to a timing control signal. In some examples, the timing control signal includes a random control signal. The timing controller 10 may generate a sensing clock signal provided to the sensing driving circuit of the gate driver 30 by using the random control signal. In some examples, the random control signal may be determined by the random array generated through the Randperm function. However, the present embodiment is not limited thereto.

In some examples, the random array may be generated by using the Randperm function in a following mode.

```
ran__ge=randperm(2160,2160);
M=2160;
data=[ ];
t=[ ];
for i=1:M;
   A=ran__ge(i)−1;
   t(i)=A;
      if(i==M)
         B=strcat(num2str(A),’;’);
      else
         B=strcat(num2str(A),’;’);
      end
      data=[data B];
   end
   fid=fopen(’random__sense__4k.coe’,’wt’);
   fwrite(fid,’memory__initialization__radix=10;’);
```

-continued

```
fprintf(fid,'\n');
fwrite(fid,'memory_initializaton_vector=');
fprintf(fid,'\n');
fwrite(fid,data);
fclose(fid);
```

In some examples, the random array may be generated by using the Randperm function through the above program, and the random array is stored in a configuration file for subsequent use.

Figure 5:
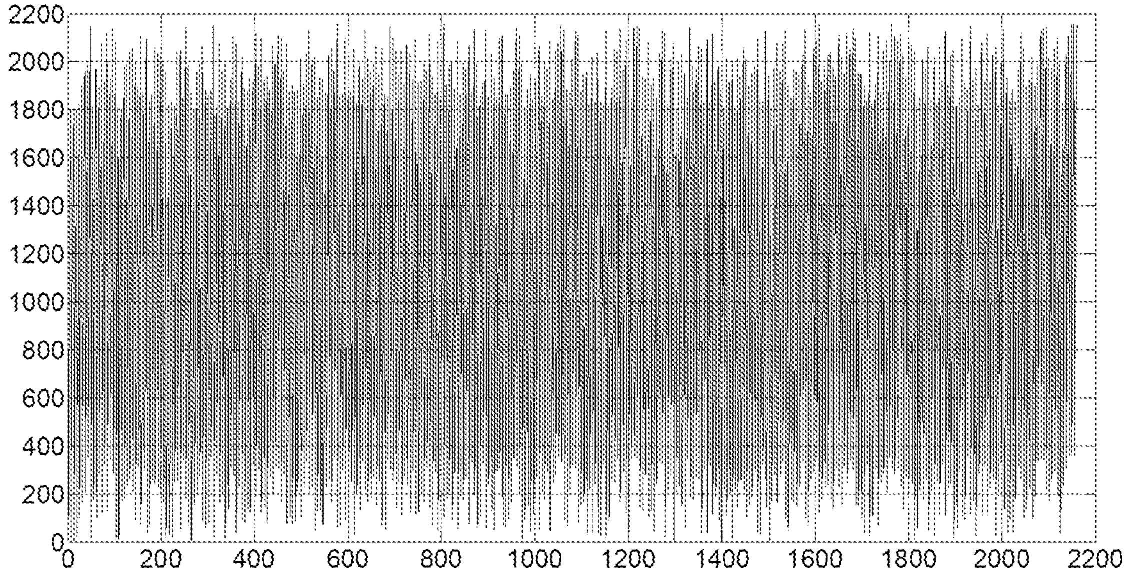
FIG. 5 is a schematic diagram of a random array according to at least one embodiment of the present disclosure.

FIG. 5 is a schematic diagram of a random array according to at least one embodiment of the present disclosure. An abscissa in FIG. 5 represents a frame number, and an ordinate represents the number of rows of the sub-pixel to be sensed. In this example, taking the display panel with a size of 3840*2160 as an example, the number of rows of the sub-pixels of the display panel is 2160. Within one sensing cycle, the electrical characteristic parameters of the driving transistors of the pixel circuits of 2160 rows of sub-pixels of the display panel are sensed in real time. The data of the random array generated in the example is random and traverses 1 to 2160, so as to meet random sensing of one sensing cycle. In this example, random sensing of one cycle may be completed in an active stage of the 2160 frames. According to the random array shown in FIG. 5, it may be determined to sense the electrical characteristic parameters of the driving transistor of the pixel circuit of which row of sub-pixels in the blank stage after which frame. That is, a random sensing sequence of sub-pixel rows of the display panel may be determined. For example, the electrical characteristic parameters of the driving transistor of the pixel circuit of a $100^{th}$ row of sub-pixels may be sensed in the blank stage between a first frame and a second frame, and the electrical characteristic parameters of the driving transistor of the pixel circuit of a $50^{th}$ row of sub-pixels may be sensed in the blank stage between the second frame and a third frame. However, the present embodiment is not limited thereto. In some examples, the random sensing of one cycle may be completed in an active stage of greater than 2160 frames. For example, the 2160 frames may be selected from the active stage of 2200 frames, and the sensing is performed according to a random sequence in the blank stages between the selected 2160 frames and adjacent frames. For example, the electrical characteristic parameters of the driving transistor of the pixel circuit of the $100^{th}$ row of sub-pixels may be sensed in the blank stage between the first frame and the second frame, and the sensing may not be performed in the blank stage between the second frame and the third frame. In some examples, during sensing one row of sub-pixels, all sub-pixels of the row may be sensed. In some examples, if the time of the blank stage is relatively short, only one or two certain sub-pixels of one row of pixels may be sensed, for example, only the electrical characteristic parameters of the driving transistor of the pixel circuit of a red sub-pixel are sensed, or the electrical characteristic parameters of the driving transistors of the pixel circuits of a red sub-pixel and a green sub-pixel are sensed.

In some exemplary implementations, the timing controller 10 may include a random signal generation circuit 101, a random control signal is generated by the random signal generation circuit, and then a sensing clock signal provided to the sensing driving circuit is generated by using the random control signal. However, the present embodiment is not limited thereto. For example, the timing controller 10 may receive a random control signal generated by an external circuit.

Figure 6:
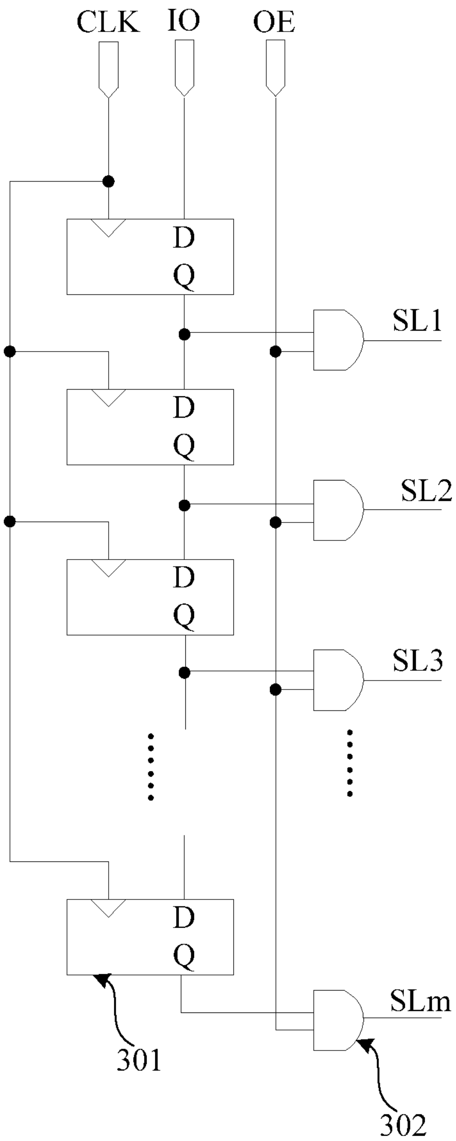
FIG. 6 is a schematic structural diagram of a sensing driving circuit according to at least one embodiment of the present disclosure.

FIG. 6 is a schematic structural diagram of a sensing driving circuit according to at least one embodiment of the present disclosure. In some exemplary implementations, as shown in FIG. 6, the sensing driving circuit of the present exemplary embodiment is configured to generate a sensing control signal provided to the sensing control line. The sensing driving circuit includes: multiple cascaded shift register units 301 and multiple logical AND gates 302. The multiple logical AND gates 302 are connected to the multiple shift register units 301 in one-to-one correspondence. An output end Q (i) of an i-th-stage shift register unit is connected to an input end D (i+1) of an (i+1)-th-stage shift register unit. Clock ends of the multiple shift register units 301 receive a sensing clock signal provided by the timing controller 10 through, for example, a sensing clock signal line CLK. An input end of the first-stage shift register unit receives a sensing starting signal from the timing controller 10 through, for example, a sensing starting signal line 10. The sensing driving circuit may sequentially shift the sensing starting signal by using the multiple cascaded shift register units 301 according to the sensing clock signal. The timing controller 10 also provides an enable control signal to the sensing driving circuit through an enable control signal line OE. A logical AND gate 302 connected to an output end of the i-th-stage shift register unit may provide the sensing control signal after performing AND on an output signal of the i-th-stage shift register unit and the enable control signal to the sensing control line SLi connected to the i-th row of sub-pixels. Herein, i is a positive integer.

In some exemplary implementations, a structure of the scanning driving circuit is similar to the structure of the sensing driving circuit, which will not be repeated herein.

In the present embodiment, CLK, IO, and OE represent signal lines and may also represent signals provided by corresponding signals lines.

Figure 7:
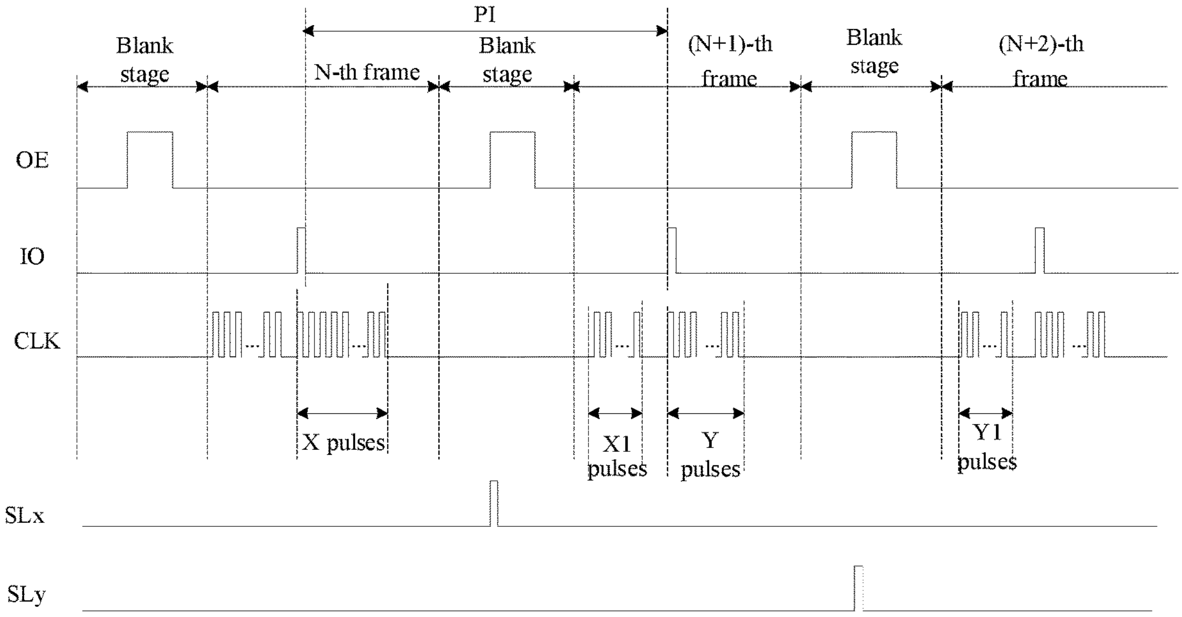
FIG. 7 is a schematic diagram of a working sequence of a sensing driving circuit according to at least one embodiment of the present disclosure.

FIG. 7 is a working timing diagram of the sensing driving circuit according to at least one embodiment of the present disclosure. In the present exemplary implementation, as shown in FIG. 7, the enable control signal OE is a pulse signal, a high-level pulse of the enable control signal OE is located in a blank stage between adjacent frames, and the enable signal OE is at a low potential in another stage. The sensing starting signal IO is a pulse signal, including a sensing pulse, wherein the sensing pulse may be provided to the sensing driving circuit in an active stage of a frame, so as to shift and output the sensing pulse to a sensing control line of a random line through the sensing driving circuit in the blank stage. The sensing clock signal CLK is a pulse signal. In some examples, the interval PI between two adjacent sensing pulses at least includes R clock pulses. R represents the total number of rows of the sub-pixels of the display panel. For example, R is 2160 rows. The pulse width of the sensing pulse is greater than the pulse width of the clock pulse and is not greater than twice the pulse width of the clock pulse. For example, the pulse width of the sensing pulse may be approximately equal to 1.5 times the pulse width of the clock pulse. The pulse width of a high-level pulse of the enable control signal is greater than that of the sensing pulse. In this example, the pulse width is a width of a pulse, and is a duration of a high level.

In some exemplary implementations, as shown in FIG. 7, in an N-th frame, the timing controller may generate a sensing clock signal including a first clock pulse group according to the random control signal, wherein the first clock pulse group may include X continuous clock pulses. The sensing driving circuit may control an X-th-stage shift register unit to output a high level according to the sensing pulse provided by a sensing initial signal IO and X continuous clock pulses, and in a blank stage between the N-th frame and an (N+1)-th frame, a high-potential sensing control signal may be provided to the sensing control line SLx connected to an X-th row of sub-pixels through a logical AND gate in combination with a high-level pulse of the enable control signal OE, so as to conduct the sensing transistor in the pixel circuit of the sub-pixel in the X-th row, sensing the electrical characteristic parameters of the driving transistor in the pixel circuit. In some examples, a starting moment of a first clock pulse in the X clock pulses is not earlier than a starting moment of the sensing pulse in the sensing starting signal. For example, a starting moment of the first clock pulse in the X clock pulses is the same as a starting moment of the sensing pulse in the sensing starting signal. Herein, X may be is a positive integer.

In some exemplary implementations, as shown in FIG. 7, in the (N+1)-th frame, the timing controller may generate a sensing clock signal including a second clock pulse group according to the random control signal. The second clock pulse group may include X1 continuous clock pulses. The sensing driving circuit is reset by using the X1 continuous clock pulses. After the sensing of the electrical characteristic parameters of the driving transistor of the sub-pixel in the X-th row is completed, the sensing pulse is shifted by using the X1 continuous clock pulses, so that multiple output signals of the sensing driving circuit are all low levels, that is, the driving transistor of any row of sub-pixels is not sensed. In some examples, X1 may be greater than R−X. Herein, X1 is a positive integer. In some examples, the X1 continuous clock pulses may be provided within an interval PI between the sensing pulse of the N-th frame and the sensing pulse of the (N+1)-th frame, and after the end of a high-level pulse of the enable control signal OE. For example, the X1 continuous clock pulses may be provided in the (N+1)-th frame, or may be provided after the end of the high-level pulse of the enable control signal OE in the blank stage between the N-th frame and the (N+1)-th frame and before providing of the sensing pulse of the (N+1)-th frame. However, the present embodiment is not limited thereto.

In some exemplary implementations, as shown in FIG. 7, in an (N+1)-th frame, the timing controller may generate a sensing clock signal including a first clock pulse group according to the random control signal, wherein the first clock pulse group may include Y continuous clock pulses. In some examples, the X1 continuous clock pulses and the Y continuous clock pulses may be not continuous. The present embodiment is not limited to an interval duration between the Y continuous clock pulses and the X1 continuous clock pulses. The sensing driving circuit may control a Y-th-stage shift register unit to output a high level according to a sensing pulse provided by the sensing initial signal IO and the Y continuous clock pulses, and in a blank stage between the (N+1)-th frame and an (N+2)-th frame, a high-level sensing control signal may be provided to the sensing control line SLy connected to a sub-pixel in a Y-th row through a logical AND gate in combination with the high level of the enable control signal OE, so as to conduct the sensing transistor in the pixel circuit of the sub-pixel in the Y-th row, sensing the electrical characteristic parameters of the driving transistor in the pixel circuit. Herein, Y is a random positive integer, and Y is different from X. X may be an N-th element value in the random array, and Y may be an (N+1)-th element value in the random array.

In some exemplary implementations, as shown in FIG. 7, in the (N+2)-th frame, the timing controller generates a sensing clock signal including a second clock pulse group according to the random control signal, wherein the second clock pulse group may include Y1 continuous clock pulses. The sensing driving circuit is reset by using the Y1 continuous clock pulses. After the sensing of the electrical characteristic parameters of the driving transistor of the sub-pixel in the Y-th row is completed, the sensing pulse is shifted by using the Y1 continuous clock pulses, so that multiple output signals of the sensing driving circuit are all low levels, that is, the driving transistor of any row of sub-pixels is not sensed. In some examples, Y1 may be greater than R−Y. Herein, Y1 is a positive integer. In some examples, the Y1 continuous clock pulses may be provided within an interval between the sensing pulse of the (N+1)-th frame and the sensing pulse of the (N+2)-th frame, and after the end of a high-level pulse of the enable control signal OE. For example, the Y1 continuous clock pulses may be provided in the (N+2)-th frame, or may be provided after the end of the high-level pulse of the enable control signal OE in the blank stage between the (N+1)-th frame and the (N+2)-th frame and before providing of the sensing pulse of the (N+2)-th frame. However, the present embodiment is not limited thereto.

In the present exemplary implementation, the sensing control signal generated by the sensing driving circuit in one blank stage may be provided to the pixel circuit of one randomly determined row of sub-pixels through the sensing control line. For example, during sensing, a test data signal is provided to a pixel circuit of a red sub-pixel in the row through a data signal line, so as to realize sensing the electrical characteristic parameters of the driving transistor of the red sub-pixel in the row. However, the present embodiment is not limited thereto.

In this exemplary implementation, according to the timing control as shown in FIG. 7, the driving transistors of R rows of sub-pixels of the display panel may be sequentially sensed, and the sensing sequence is randomly determined, so as to complete one sensing cycle. In a subsequent sensing cycle, the random sensing sequence that has been determined in this sensing cycle may be used, or a random sensing sequence may be regenerated. Thus, a viewer cannot consider perceiving a position of a horizontal dark line generated by real-time sensing in advance, so as to improve user experience.

At least one embodiment of the present disclosure further provides a display panel, including: a pixel array and a gate driver. The pixel array includes multiple sub-pixels, wherein at least one sub-pixel includes a light emitting element and a pixel circuit that drives the light emitting element to emit light. The gate driver is configured to provide a sensing control signal to the pixel circuit of the sub-pixel in the X-th row through a sensing control line within a blank stage between an N-th frame and an (N+1)-th frame, so as to sense the electrical characteristic parameters of a driving transistor of a pixel circuit of a sub-pixel in an X-th row. Herein, X is a random number, and both N and X are positive integers.

In some exemplary implementations, the display panel of the present embodiment further includes: a timing controller. The timing controller is configured to generate a sensing clock signal by using a random control signal, and provide the sensing clock signal for the gate driver. The gate driver is configured to generate a sensing control signal provided for the pixel circuit of the sub-pixel in the X-th row in a blank stage between the N-th frame and the (N+1)-th frame by using a sensing clock signal, a sensing starting signal, and an enable control signal.

In some exemplary implementations, the timing controller includes: a random signal generation circuit, configured to generate a random control signal.

In some exemplary implementations, the gate driver includes: a sensing driving circuit. The sensing driving circuit includes: multiple cascaded shift register units and multiple logical AND gates. An output end of an i-th-stage shift register unit is connected to an input end of an (i+1)-th-stage shift register unit, and an input end of the first-stage shift register unit is connected to a sensing starting signal line that provides a sensing starting signal. Clock ends of the multiple shift register units are connected to a sensing clock signal line that provides a sensing clock signal. An input end of an i-th logical AND gate is connected to an output end of the i-th-stage shift register unit and an enable control line that provides an enable control signal, and an output end of the i-th logical AND gate is connected to a sensing control line connected to the pixel circuit of the i-th row of sub-pixels. Herein, i is a positive integer.

In some exemplary implementations, the pixel circuit includes: an input transistor, a driving transistor, a sensing transistor, and a first storage capacitor. A control electrode of the input transistor is connected to a scanning signal line, a first electrode is connected to a data signal line, and a second electrode is connected to a control electrode of the driving transistor. A first electrode of the driving transistor is connected to a first power supply line, and a second electrode is connected to a light emitting element. A first electrode of the first storage capacitor is connected to the control electrode of the driving transistor, and a second electrode is connected to the second electrode of the driving transistor. A control electrode of the sensing transistor is connected to a sensing control line, a first electrode is connected to the second electrode of the driving transistor, and a second electrode is connected to a sensing signal line.

Relevant description of the structure of the display panel of the present embodiment is as described above, which will not be repeated herein.

The accompanying drawings in the present disclosure only relate to the structures related to the present disclosure, and another structure may refer to a general design. The embodiments of the present disclosure and features in the embodiments may be combined mutually to obtain a new embodiment if there is no conflict.

Those of ordinary skill in the art should understand that modification or equivalent replacement may be made to the technical solutions of the present disclosure without departing from the spirit and the scope of the technical solutions of the present disclosure, and should all fall within the scope of the claims of the present disclosure.

The invention claimed is:

1. A method for sensing a display panel, comprising:

sensing an electrical characteristic parameter of a driving transistor of a pixel circuit of a sub-pixel in an X-th row in a blank stage between an N-th frame and an (N+1)-th frame;

wherein both N and X are positive integers, and the X is a random number;

wherein the sensing an electrical characteristic parameter of a driving transistor of a pixel circuit of a sub-pixel in an X-th row in a blank stage between an N-th frame and an (N+1)-th frame comprises:

generating a sensing clock signal by using a random control signal; and generating, by a sensing driving circuit, a sensing control signal provided for the pixel circuit of the sub-pixel in the X-th row in the blank stage between the N-th frame and the (N+1)-th frame by using the sensing clock signal, a sensing starting signal, and an enable control signal;

wherein the sensing clock signal, the sensing starting signal, and the enable control signal are pulse signals; a pulse width of a sensing pulse of the sensing starting signal is greater than a pulse width of a clock pulse of the sensing clock signal and is not greater than twice the pulse width of the clock pulse, and a pulse width of the enable control signal is greater than the pulse width of the sensing pulse.

2. The method of claim 1, wherein the X is a non-repeating random number determined by traversing a first range, wherein the first range comprises positive integers not greater than R, and the R is a total number of rows of sub-pixels of the display panel.

3. The method of claim 2, wherein in a first sensing cycle, a value range of the N is the first range.

4. The method of claim 1, wherein a relationship between N and X within at least one sensing cycle is determined by a Randperm function.

5. The method of claim 4, wherein a random array is obtained by the Randperm function, and the X is an N-th element value in the random array.

6. The method of claim 1, wherein the sensing starting signal comprises a sensing pulse, and R clock pulses are at least comprised between adjacent sensing pulses, wherein the R is a total number of rows of sub-pixels of the display panel.

7. The method of claim 1, wherein a sensing pulse provided by the sensing starting signal in the N-th frame is shifted to output to the pixel circuit of the sub-pixel in the X-th row by the sensing driving circuit in the blank stage between the N-th frame and the (N+1)-th frame.

8. The method of claim 7, wherein the sensing clock signal provided for the sensing driving circuit in the N-th frame comprises a first clock pulse group, wherein the first clock pulse group comprises X clock pulses, and a starting moment of a first clock pulse in the X clock pulses is not earlier than a starting moment of the sensing pulse in the sensing starting signal provided for the sensing driving circuit in the N-th frame.

9. The method of claim 1, further comprising: after completing sensing the electrical characteristic parameter of the driving transistor of the pixel circuit of the sub-pixel in the X-th row, resetting the sensing driving circuit by using a second clock pulse group of the sensing clock signal, wherein the second clock pulse group comprises X1 clock pulses, X1 is greater than R–X, and the R is a total number of rows of sub-pixels of the display panel.

10. The method of claim 9, further comprising: generating, by the sensing driving circuit, a sensing control signal provided for a pixel circuit of a sub-pixel in a Y-th row in a blank stage between an (N+1)-th frame and an (N+2)-th frame by using a sensing pulse provided by the sensing starting signal in the (N+1)-th frame, a first clock pulse group provided by the sensing clock signal in the (N+1)-th frame, and the enable control signal, wherein the first clock pulse group provided by the sensing clock signal in the (N+1)-th frame comprises Y clock pulses; and the Y is a random positive integer, and the Y is different from the X.

11. The method of claim 10, wherein Y clock pulses and X1 clock pulses are not continuous.

12. The method of claim 10, further comprising: after completing sensing the electrical characteristic parameter of the driving transistor of the pixel circuit of the sub-pixel in the Y-th row, resetting the sensing driving circuit by using a second clock pulse group of the sensing clock signal, wherein the second clock pulse group comprises Y1 clock pulses, the Y1 is greater than R−Y, and the R is a number of rows of sub-pixels of the display panel.

13. The method of claim 1, wherein the sensing an electrical characteristic parameter of a driving transistor of a pixel circuit of a sub-pixel in an X-th row in a blank stage between an N-th frame and an (N+1)-th frame comprises:

sensing the electrical characteristic parameter of the driving transistor of the pixel circuit of sub-pixels of b colors in the X-th row of sub-pixels in the blank stage between the N-th frame and the (N+1)-th frame, wherein b is a positive integer, and b is less than or equal to a number of sub-pixels comprised in one pixel unit.

14. A display panel, comprising a pixel array and a gate driver, wherein the pixel array comprises a plurality of sub-pixels, and at least one sub-pixel comprises a light emitting element and a pixel circuit that drives the light emitting element to emit light;

the gate driver is configured to provide a sensing control signal for the pixel circuit of a sub-pixel in an X-th row by a sensing control line in a blank stage between an N-th frame and an (N+1)-th frame, to sense an electrical characteristic parameter of the driving transistor of the pixel circuit of the sub-pixel in the X-th row;

wherein both N and X are positive integers, and the X is a random number;

further comprising a timing controller, wherein the timing controller is configured to generate a sensing clock signal by using a random control signal, and provide the sensing clock signal for the gate driver; and the gate driver is configured to generate a sensing control signal provided for the pixel circuit of the sub-pixel in the X-th row in the blank stage between the N-th frame and the (N+1)-th frame by using the sensing clock signal, a sensing starting signal, and an enable control signal;

wherein the sensing clock signal, the sensing starting signal, and the enable control signal are pulse signals; a pulse width of a sensing pulse of the sensing starting signal is greater than a pulse width of a clock pulse of the sensing clock signal and is not greater than twice the pulse width of the clock pulse, and a pulse width of the enable control signal is greater than the pulse width of the sensing pulse.

15. The display panel of claim 14, wherein the timing controller comprises: a random signal generation circuit, configured to generate the random control signal.

16. The display panel of claim 14, wherein the gate driver comprises: a sensing driving circuit, wherein the sensing driving circuit comprises: a plurality of cascaded shift register units and a plurality of logical AND gates;

an output end of an i-th-stage shift register unit is connected to an input end of an (i+1)-th-stage shift register unit, and an input end of a first-stage shift register unit is connected to a sensing starting signal line that provides a sensing starting signal; and clock ends of the plurality of shift register units are connected to a sensing clock signal line that provides a sensing clock signal;

an input end of an i-th logical AND gate is connected to an output end of the i-th-stage shift register unit and an enable control line that provides an enable control signal, and an output end of the i-th logical AND gate is connected to a sensing control line connected to the pixel circuit of the sub-pixel in an i-th row;

wherein i is a positive integer.

17. The display panel of claim 14, wherein the pixel circuit comprises: an input transistor, a driving transistor, a sensing transistor, and a first storage capacitor;

a control electrode of the input transistor is connected to a scanning signal line, a first electrode of the input transistor is connected to a data signal line, and a second electrode of the input transistor is connected to a control electrode of the driving transistor;

a first electrode of the driving transistor is connected to a first power supply line, and a second electrode of the driving transistor is connected to a light emitting element;

a first electrode of the first storage capacitor is connected to the control electrode of the driving transistor, and a second electrode of the first storage capacitor is connected to the second electrode of the driving transistor; and a control electrode of the sensing transistor is connected to a sensing control line, a first electrode of the sensing transistor is connected to the second electrode of the driving transistor, and a second electrode of the sensing transistor is connected to a sensing signal line.

* * * * *